United States Patent
Soldano

(10) Patent No.: US 7,355,868 B2
(45) Date of Patent: Apr. 8, 2008

(54) CURRENT SENSE METHOD FOR BRIDGELESS BOOST (BLB) PFC CIRCUIT USING SINGLE CURRENT TRANSFORMER

(75) Inventor: Marco Soldano, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 176 days.

(21) Appl. No.: 11/396,455

(22) Filed: Mar. 28, 2006

(65) Prior Publication Data

US 2006/0220628 A1    Oct. 5, 2006

Related U.S. Application Data

(60) Provisional application No. 60/667,008, filed on Mar. 31, 2005.

(51) Int. Cl.
*H02M 5/42* (2006.01)
*H02J 1/02* (2006.01)

(52) U.S. Cl. .................................................. 363/89

(58) Field of Classification Search .................. 363/39, 363/44, 84, 89, 125–127; 323/222, 223, 323/225, 229, 247, 259
See application file for complete search history.

(56) References Cited

U.S. PATENT DOCUMENTS

| | | | |
|---|---|---|---|
| 4,412,277 A | | 10/1983 | Mitchell |
| 5,946,201 A | * | 8/1999 | Kim ........................ 363/21.16 |
| 6,316,883 B1 | * | 11/2001 | Cho et al. ................... 315/247 |
| 6,834,002 B2 | * | 12/2004 | Yang ............................ 363/89 |
| 6,987,676 B2 | * | 1/2006 | Cheng et al. ............. 363/21.12 |
| 7,061,779 B2 | * | 6/2006 | Yang ........................ 363/21.04 |
| 7,164,591 B2 | * | 1/2007 | Soldano ........................ 363/89 |
| 7,215,560 B2 | * | 5/2007 | Soldano et al. ............... 363/44 |

OTHER PUBLICATIONS

"Mechanism of Common-Mode Noise Reduction in Balanced Boost Switching Converter", Shoyama M., Tsumura T., and Ninomiya T., PESC'04, p. 1115-1120.

A. deSouza and I. Barbi, "A New ZVS-PWM Unity Power Factor Rectifier with Reduced Conduction Losses," IEEE Transactions on Power Electronics, Nov. 1995, pp. 746-752.

* cited by examiner

*Primary Examiner*—Matthew V. Nguyen
(74) *Attorney, Agent, or Firm*—Ostrolenk, Faber, Gerb & Soffen, LLP

(57) ABSTRACT

A circuit and method for improving current sensing in a bridgeless PFC boost converter. Such a converter comprises a current transformer having first and second primaries; a boost inductor having a first end connected to a first AC input terminal and a second end connected to a first junction defined between the anode of a first diode and a first end of the first primary, the second end of the first primary being connected to a first terminal of the first switch; a second terminal of the first switch being connected to a common line; a parallel circuit of a capacitance and a load connected between the cathode of the first diode and the common line; a series circuit of a second diode, the second primary and a second switch connected between the cathode of the first diode and the common line; and a second AC input terminal connected to a second junction defined between the second primary and the second switch. A second boost inductor may be connected between the second AC input terminal and the second junction. The first and second switches may be MOSFETs. The circuit also includes a rectification circuit on first and second secondaries of the current transformer, comprising a MOSFET and additional diodes.

9 Claims, 4 Drawing Sheets

CURRENT TRANSFORMER PRIMARY SIDE CONNECTION

CURRENT TRANSFORMER SECONDARY SIDE CONNECTION

POSITIVE HALF LINE CYCLE
PRIOR ART

NEGATIVE HALF LINE CYCLE
PRIOR ART

CURRENT TRANSFORMER SECONDARY SIDE CONNECTION

CURRENT TRANSFORMER PRIMARY SIDE CONNECTION

NEGATIVE HALF LINE CYCLE

RESET

POSITIVE HALF LINE CYCLE

TRANSFERRING SIGNAL

CURRENT SENSE METHOD FOR BRIDGELESS BOOST (BLB) PFC CIRCUIT USING SINGLE CURRENT TRANSFORMER

CROSS REFERENCE TO RELATED APPLICATIONS

This application is based upon and claims priority of U.S. Provisional Application Ser. No. 60/667,008, filed Mar. 31, 2005, incorporated by reference.

A related application is Ser. No. 11/301,464 filed Dec. 13, 2005 also incorporated by reference.

BACKGROUND OF THE INVENTION

1. Field of the Invention

The present invention relates to a current sense circuit and method for a bridgeless boost (BLB) PFC circuit using a single current transformer.

2. Background Art

The bridgeless boost PFC has proved to be a good alternative topology for a power factor correction circuit, as shown in FIG. 1. Compared with the conventional PFC circuit using a bridge, shown in FIG. 2, the bridgeless PFC circuit reduces the number of semiconductors in the conduction path. For the conventional PFC, there are three semiconductors in the current conduction path. As for the bridgeless PFC, only two semiconductor devices are in the conduction path at any time. Considering that both of the circuits work as a boost DC/DC converter, the switching loss should be the same. Therefore, the bridgeless PFC can reduce the circuit conduction loss and improve the circuit efficiency. Further, since the circuit only uses two MOSFETs and two diodes, as compared with the conventional PFC, which has one MOSFET and five diodes, the circuit is much simplified.

Although the bridgeless PFC circuit of FIG. 1 has a simplified circuit structure and improved efficiency, the issue of current sensing is problematical.

For the conventional PFC circuit of FIG. 2, the inductor current can be sensed through a shunt resistor placed in series in the return path of the inductor, as shown in FIG. 3. Thus the current signal is transformed into a voltage signal which can be used for control purposes. However, for the bridgeless PFC circuit, the inductor current return path is at the AC side, as shown in FIG. 4. Normally the control circuit has a common ground with the output. Therefore, an isolated current sensing method is required for the bridgeless PFC.

To achieve isolated current sensing, a 50 or 60 Hz current transformer gives a straightforward solution, as illustrated in FIG. 5. However, since the low frequency current transformer will cause a large phase different between the input and output signals, using the sensed signal to control the power factor correction circuit will impair the power factor. Further, the low frequency transformer is large, heavy and also expensive, thus it cannot be accepted for kilowatt-range power supplies.

Another isolated current sensing method is to use a differential mode amplifier, as shown in FIG. 6. The differential mode amplifier doesn't have a phase difference between the input and output. It can give a good control signal. However, since the bridgeless PFC operates at a high switching frequency and a high output voltage, the common mode voltage in the differential mode amplifier will generate noise on the sensed signal. Considering that the sensing voltage is kept low to minimize the power loss in the shunt resistor, the noise caused by the common mode voltage can distort the sensed current. Further, since the differential mode amplifier is expensive and requires an extra power supply, it is not a practical solution either.

Another current sensing method is high frequency reconstruction, as shown in FIG. 7. In this current sensing scheme, two current transformers T1 and T2 are in series with S1 and S2. In each half line cycle, one of them is saturated and gives no output signal and the other one gives the switching current signal. The current transformer T3 is able to sense the diode current. By adding the switch currents together with the diode current through the high frequency current transformers, the inductor current can be sensed. Therefore, a total of three current transformers are required for the control circuit. Even using peak current mode control, wherein only the switching current is required for the power factor correction control, at least two current transformers are still required.

Because of these drawbacks, although the bridgeless PFC circuit has existed for around 20 years, it still hasn't been accepted by the industry. Not only does the circuit suffer from a severe EMI noise problem, it also has the issues of voltage sensing and current sensing. Therefore, in the past 20 years, most of the work has been directed to solving the control issues of the circuit. One attractive method has been shown to improve the current sensing and voltage sensing issues of the bridgeless PFC circuit. The circuit schematic is shown in FIG. 8.

In FIG. 9, (a) and (b) are the respective equivalent circuits of the circuit operating in the positive and negative half line cycles. In each half line cycle, the bridgeless PFC circuit works as a boost DC/DC converter. The whole circuit is equivalent to two boost circuits added together. All the inductor current will go through the shunt resistor, where the inductor current can be sensed and can be used for the control circuit.

Although this circuit can provide good current sensing in the bridgeless PFC circuit, it still has several constraints:

Two extra diodes need to be used.

The two extra diodes require an extra heat sink, which makes the circuit even more expensive.

By using the shunt resistor, extra power loss is introduced in the circuit.

It would be desirable to reduce the component count, cost and current sensing loss.

SUMMARY OF THE INVENTION

The present invention is directed to making further improvements in the bridgeless PFC circuit, and in particular, avoiding the constraints and disadvantages mentioned above.

To further simplify the current sensing scheme, a new current sensing method for the bridgeless PFC is provided, only using one current transformer. By sensing the switch current with only one current transformer, current sensing losses can be reduced. Further, the extra diodes of the circuit of FIG. 8 are not needed. For the proposed circuit, therefore, both the current transformer cost and the silicon cost will be much cheaper as compared with other high power semiconductor devices, and losses will also be much less.

According to the invention, a circuit and method is provided for improving current sensing in a bridgeless PFC boost converter. Such a converter comprises a current transformer having first and second primaries; a boost inductor having a first end connected to a first AC input terminal and a second end connected to a first junction defined between the anode of a first diode and a first end of the first primary, the second end of the first primary being connected to a first terminal of the first switch; a second terminal of the first switch being connected to a common line; a parallel circuit of a capacitance and a load connected between the cathode of the first diode and the common line; a series circuit of a second diode, the second primary and a second switch connected between the cathode of the first diode and the common line; and a second AC input terminal connected to a second junction defined between the second primary and the second switch. A second boost inductor may be connected between the second AC input terminal and the second junction. The first and second switches may be MOSFETs. The circuit also includes a rectification circuit on first and second secondaries of the current transformer, comprising a MOSFET and additional diodes.

Other features and advantages of the present invention will become apparent from the following description of an embodiment of the invention which refers to the accompanying drawings.

DETAILED DESCRIPTION OF AN EMBODIMENT OF THE INVENTION

Figure 1:
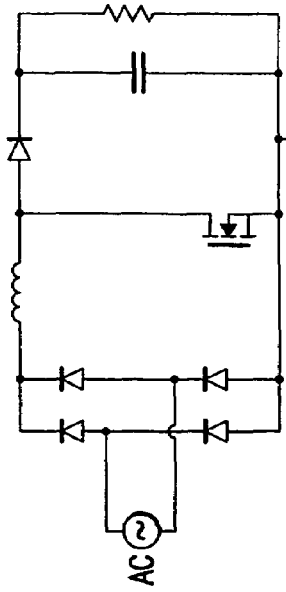
FIG. 1 shows a known bridgeless PFC circuit.
Figure 2:
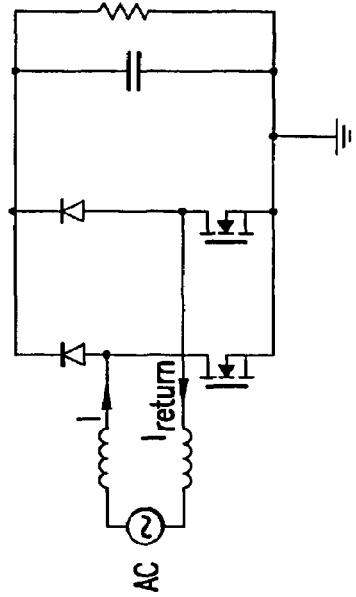
FIG. 2 shows a conventional PFC circuit.
Figure 3:
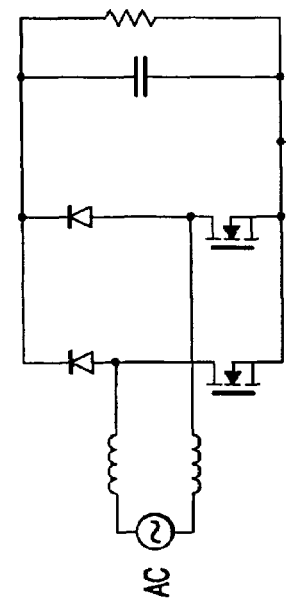
FIG. 3 shows a current sensing arrangement for the conventional PFC circuit.
Figure 4:
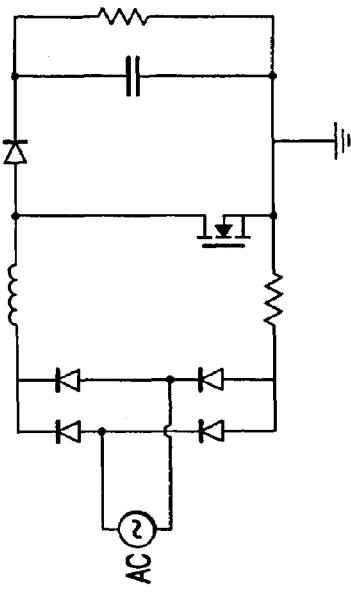
FIG. 4 shows a current return path for the bridgeless PFC circuit of FIG. 1.
Figure 6:
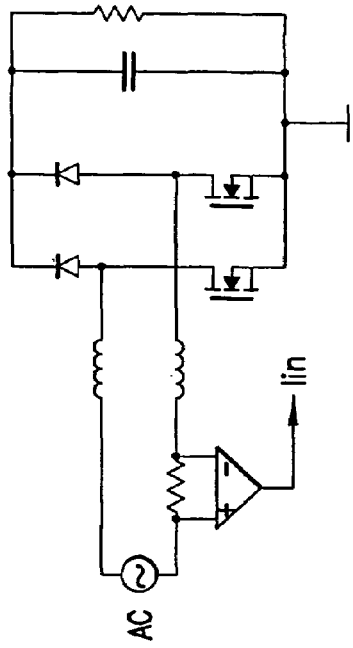
FIG. 6 shows a current sensing arrangement for the bridgeless PFC using a differential mode amplifier.
Figure 8:
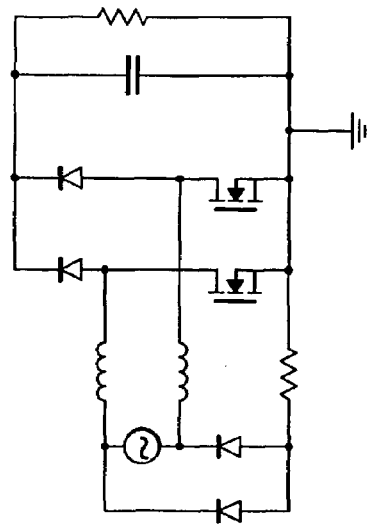
FIG. 8 shows another circuit that can improve the EMI performance of the known bridgeless PFC circuit.
Figure 5:
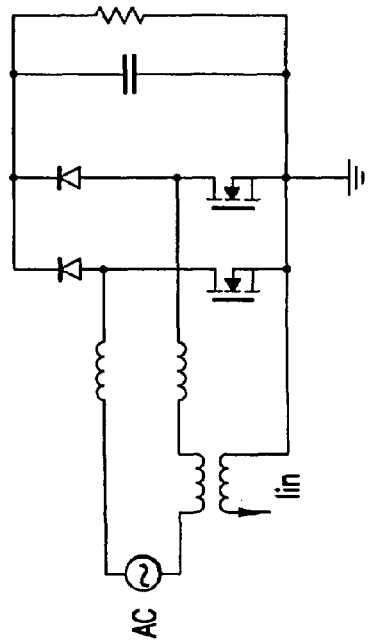
FIG. 5 shows a current sensing arrangement for the bridgeless PFC using a low frequency transformer.
Figure 7:
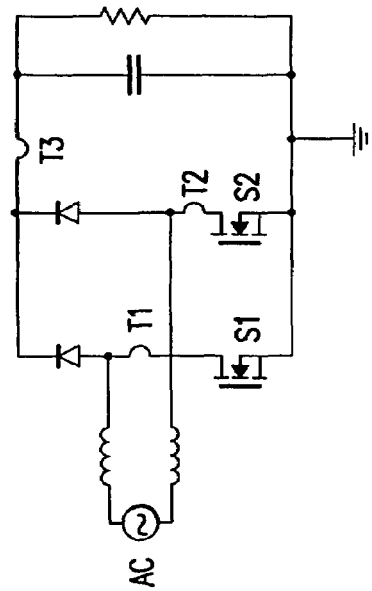
FIG. 7 shows a current sensing arrangement for the bridgeless PFC using high frequency reconstruction.
Figure 9A:
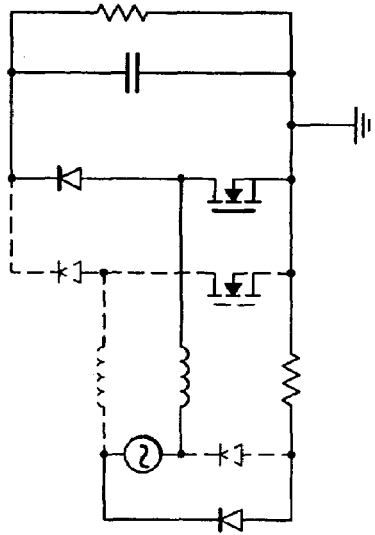
FIGS. 9(a) and 9(b) show equivalent circuits for different half line cycles in the circuit of FIG. 8.
Figure 9B:
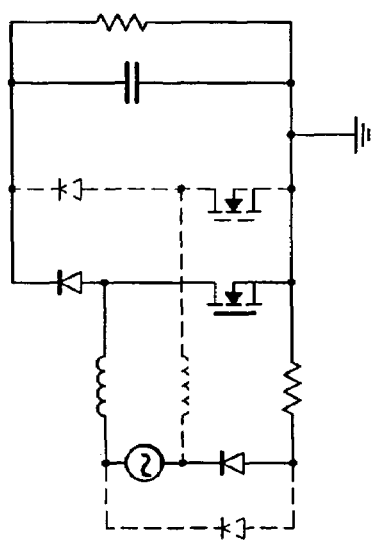
Figure 10B:
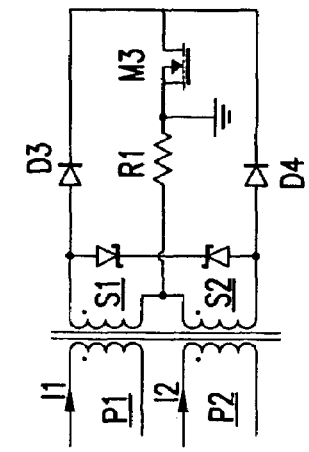
FIGS. 10(a) and 10(b) show a proposed new current sensing scheme.
Figure 10A:
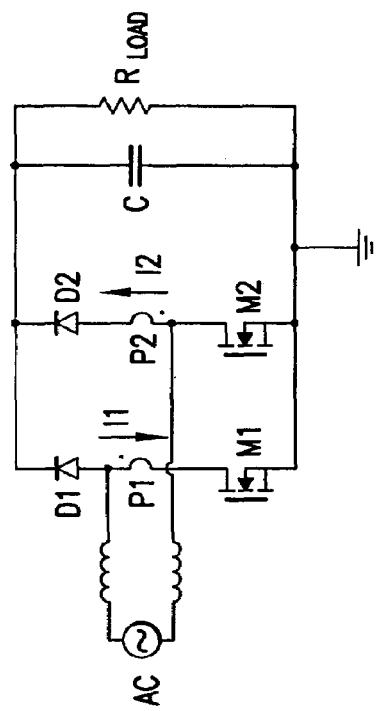

The current sensing scheme schematic diagram is shown in FIGS. 10(a) and 10(b).

The current transformer has two primary windings P1, P2 and two secondary windings S1, S2. Both of the primary windings have a single turn and the secondary windings have many more turns, typically 50 or 100 turns. The equivalent primary current of the current transformer is equal to the sum of I1 and I2.

Figure 11B:
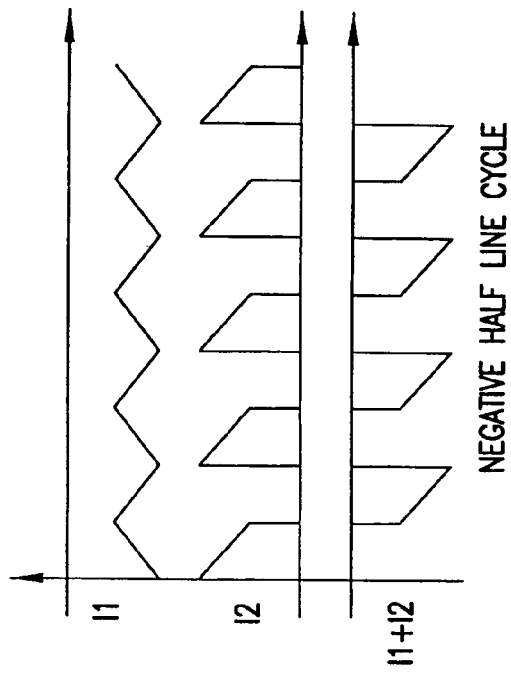
FIGS. 11(a) and 11(b) show current transformer primary side current in the positive and negative half line cycles, respectively.
Figure 11A:
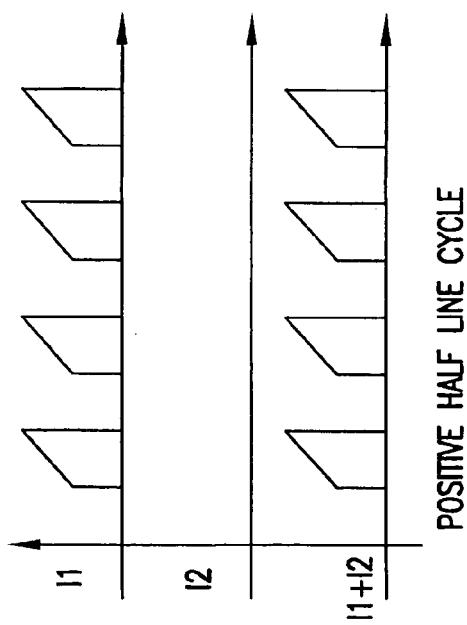

To get a clear understanding of the current sensing scheme, the current waveform that goes through the current transformer is illustrated in FIGS. 11(a) and 11(b). From the waveforms, it is seen that for both of the half line cycles, the equivalent primary side current is the total switch current through MOSFETs M1, M2. However, more specifically, for the positive half line cycle, the equivalent primary side current is the total switch current I1+I2, while for the negative half line cycle, the equivalent primary side current is the negative of the total switch current I1+I2. Therefore, the next step in this current sensing method is to rectify the current signal.

Figure 12B:
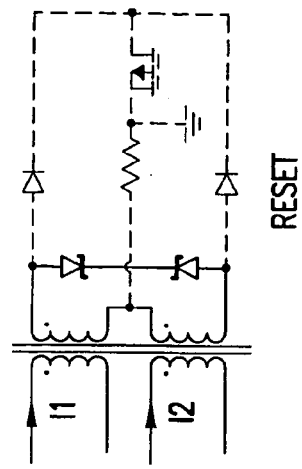
FIGS. 12(a) and 12(b) show equivalent circuits for the current transformer secondary rectifying circuit of FIG. 10(b), in the transfer and reset operating phases, respectively.
Figure 12A:
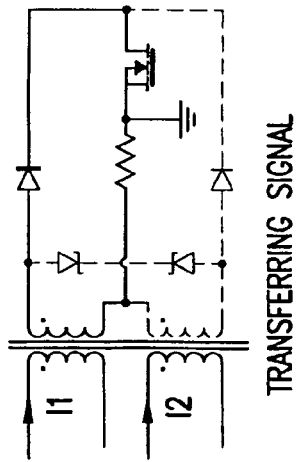

The rectifying circuit is shown in FIG. 10(b). The equivalent circuits of the current transformer when transferring the signal and when resetting the magnetic field are shown in FIGS. 12(a) and 12(b), respectively. When the primary side conducts current, the MOSFET M3 is turned on, so that the secondary side S1 current loop is closed via diode D3 and blocked by diode D4, and the primary side current can be sensed through the shunt resistor R1. When the primary side is not conducting current, the MOSFET M3 is turned off, and the current path is illustrated in FIG. 12(b), through the secondary windings S1, S2 and the pair of opposed zener diodes Z1, Z2 connected across them. In this period, the current transformer magnetic field is reset. From this analysis, it is seen that the MOSFET can use the same gate signal as the power stage switches.

As compared with the other current sensing methods, the proposed circuit has at least the following benefits:

Simple structure, only one high frequency current transformer is required.

No extra control circuit required, the MOSFET current sensing circuit can share the same gate driver signal of the power stage switches.

Low power loss. Compared with the shunt resistor, the current transformer resistor only carries a small amount of current, whereby less power loss is generated.

Although the present invention has been described in relation to particular embodiments thereof, many other variations and modifications and other uses will become apparent to those skilled in the art. Therefore, the present invention is not limited by the specific disclosure herein.

What is claimed is:

1. A bridgeless PFC boost converter comprising:
   a current transformer having first and second primaries;
   a boost inductor having a first end connected to a first AC input terminal and a second end connected to a first junction defined between the anode of a first diode and a first end of said first primary, the second end of the first primary being connected to a first terminal of a first switch;
   a second terminal of the first switch connected to a common line;
   a parallel circuit of a capacitance and a load connected between the cathode of the first diode and the common line;
   a series circuit of a second diode, said second primary and a second switch connected between the cathode of the first diode and the common line; and
   a second AC input terminal connected to a second junction defined between the second primary and the second switch.

2. A bridgeless PFC boost converter according to claim 1, further comprising a second boost inductor connected between said second AC input terminal and said second junction.

3. A bridgeless PFC boost converter according to claim 1, wherein said first and second switches are MOSFETs.

4. A bridgeless PFC boost converter according to claim 3, wherein said first and second switches are MOSFETs, each having a respective body diode whose cathode is connected to the corresponding one of said first and second primaries.

5. A bridgeless PFC boost converter according to claim 4, wherein said MOSFETs each have a pair of main terminals connected respectively to said common line and to the corresponding one of said first and second primaries; and a gate terminal for controlling the MOSFET.

6. A bridgeless PFC boost converter according to claim 1, wherein said current transformer has first and second secondaries, respective second ends of said first and second secondaries being connected together at a third junction; and
   a rectifying circuit connected to said secondaries.

7. A bridgeless PFC boost converter according to claim 6, wherein said rectifying circuit comprises:
   a series connection of a resistor and a third switch being connected to said third junction;
   a junction between said resistor and said third switch being connected to said common line;
   a pair of zener diodes having their cathodes connected together and their anodes connected respectively to said second ends of said first and second secondaries; and
   a pair of diodes having their cathodes connected to said third switch and their anodes connected respectively to said first ends of said first and second secondaries.

8. A bridgeless PFC boost converter according to claim 7, wherein said third switch is a MOSFET.

9. A bridgeless PFC boost converter according to claim 8, wherein said third switch is a MOSFET having a pair of main terminals connected respectively to said resistor and to said cathodes of said pair of diodes, and a gate terminal for controlling the MOSFET.

* * * * *